US012221840B2

(12) United States Patent
Lindblom et al.

(10) Patent No.: US 12,221,840 B2
(45) Date of Patent: Feb. 11, 2025

(54) END EFFECTOR FOR GRIPPING AND SPINNING PIPES

(71) Applicant: National Oilwell Varco Norway AS, Kristiansand S (NO)

(72) Inventors: Andreas Johan Lindblom, Kristiansand (NO); Morten Roger Sporsheim, Kristiansand (NO); Arnstein Bernt Olsen, Kristiansand (NO)

(73) Assignee: GRANT PRIDECO, INC., Houston, TX (US)

( * ) Notice: Subject to any disclaimer, the term of this patent is extended or adjusted under 35 U.S.C. 154(b) by 302 days.

(21) Appl. No.: 17/848,002

(22) Filed: Jun. 23, 2022

(65) Prior Publication Data

US 2023/0067025 A1    Mar. 2, 2023

(30) Foreign Application Priority Data

Aug. 27, 2021 (EP) .................................... 21193466

(51) Int. Cl.
  *E21B 19/16*  (2006.01)
  *B25J 15/00*  (2006.01)
  *B25J 19/02*  (2006.01)

(52) U.S. Cl.
  CPC ......... *E21B 19/168* (2013.01); *B25J 15/0038* (2013.01); *B25J 19/02* (2013.01)

(58) Field of Classification Search
  CPC ...... E21B 19/168; E21B 19/164; E21B 21/00; E21B 21/01; E21B 21/019; B25J 15/0038;

(Continued)

(56) References Cited

U.S. PATENT DOCUMENTS 6,910,402 B2 *  6/2005  Drzewiecki ........... E21B 19/164
                                                        81/57.2
7,114,234 B2 * 10/2006  Penman ................ E21B 19/168
                                                        29/464

(Continued)

FOREIGN PATENT DOCUMENTS

CN    112065303    12/2020
WO    2007/143842  12/2007

(Continued)

OTHER PUBLICATIONS

European Search Report dated Feb. 8, 2022, for European Application No. 21193466 (2 p.).

*Primary Examiner* — David B. Thomas
(74) *Attorney, Agent, or Firm* — CONLEY ROSE, P.C.

(57) ABSTRACT

An end effector for gripping and spinning a pipe includes a head portion including a first connection interface for connecting the end effector to a robotic arm. In addition, the end effector includes a pair of jaws rotatably connected to the head portion between an open position and a gripping position. Further, the end effector includes a spinner for spinning a pipe held by the pair of jaws in the gripping position around a spinning axis generally corresponding to a longitudinal centre axis of the pipe. The first connection interface has a normal which is substantially parallel to the spinning axis. There is also disclosed a robot including an end effector as well a robot assembly and a drilling installation including such as robot.

15 Claims, 6 Drawing Sheets

(58) Field of Classification Search
CPC .. B25J 19/02; B25B 13/5008; B25B 13/5016; B25B 13/5041; B25B 13/50; B25B 21/002
See application file for complete search history.

(56) References Cited

U.S. PATENT DOCUMENTS

| | | | | |
|---|---|---|---|---|
| 7,707,914 B2* | 5/2010 | Pietras | ................ | E21B 19/164 |
| | | | | 81/57.2 |
| 8,146,971 B2* | 4/2012 | LaValley | ............... | E21B 19/155 |
| | | | | 294/81.61 |
| 8,490,519 B2* | 7/2013 | Lavalley | ............... | E21B 19/168 |
| | | | | 81/57.35 |
| 8,490,520 B2* | 7/2013 | Hunter | ................ | E21B 19/164 |
| | | | | 81/57.2 |
| 9,097,072 B2* | 8/2015 | Perez | ................ | E21B 19/165 |
| 9,404,324 B2* | 8/2016 | Hunter | ................ | E21B 19/165 |
| 9,493,996 B2* | 11/2016 | Lavalley | ............... | E21B 19/163 |
| 9,702,207 B2* | 7/2017 | Randall, Jr. | ............. | E21B 19/16 |
| 10,036,216 B2* | 7/2018 | Perez | ................ | E21B 19/161 |
| 10,119,346 B2* | 11/2018 | Randall | ................ | E21B 19/168 |
| 10,184,304 B2* | 1/2019 | LaValley | ............... | E02F 3/965 |
| 10,247,279 B2* | 4/2019 | Scekic | ................ | F16H 57/082 |
| 10,309,170 B2* | 6/2019 | Bourgeois | ............. | E21B 19/165 |
| 10,329,857 B2* | 6/2019 | Hunter | ................ | E21B 19/164 |
| 10,344,892 B2* | 7/2019 | Lavalley | ............ | B23K 37/0288 |
| 10,370,913 B2* | 8/2019 | Søyland | ................ | E21B 19/168 |
| 10,774,601 B2* | 9/2020 | Søyland | ................ | F16H 19/001 |
| 10,808,465 B2* | 10/2020 | Mikalsen | ................ | E21B 19/06 |
| 10,844,977 B2* | 11/2020 | Lavalley | ............ | B23K 37/0288 |
| 10,900,301 B2* | 1/2021 | Tompkins | ............. | E21B 19/163 |
| 10,995,564 B2* | 5/2021 | Miller | ................ | E21B 19/155 |
| 11,015,402 B2* | 5/2021 | Mikalsen | ................ | E21B 19/155 |
| 11,060,362 B2* | 7/2021 | Perez | ................ | E21B 19/168 |
| 11,078,734 B2* | 8/2021 | Søyland | ................ | F16B 2/185 |
| 11,236,558 B2* | 2/2022 | LaValley | ............... | E21B 19/163 |
| 11,313,184 B2* | 4/2022 | Søyland | ................ | E21B 19/168 |
| 11,454,069 B2* | 9/2022 | Tambs | ................ | E21B 19/164 |
| 11,603,949 B2* | 3/2023 | LaValley | ............... | B23K 37/027 |
| 11,613,940 B2* | 3/2023 | McKenzie | ............ | E21B 19/084 |
| | | | | 414/22.71 |
| 11,814,910 B2* | 11/2023 | Tambs | ................ | E21B 19/164 |
| 2005/0056122 A1* | 3/2005 | Belik | .................... | E21B 19/161 |
| | | | | 81/57.16 |
| 2010/0139461 A1* | 6/2010 | Bangert | ................ | E21B 19/07 |
| | | | | 427/180 |
| 2016/0290075 A1* | 10/2016 | Hunter | ................ | E21B 19/165 |
| 2018/0355685 A1* | 12/2018 | Perez | ................ | E21B 19/161 |
| 2019/0106951 A1* | 4/2019 | Lavalley | ................ | B66C 1/427 |

FOREIGN PATENT DOCUMENTS

| | | |
|---|---|---|
| WO | WO2012/162617 | 11/2012 |
| WO | WO 2020/197412 | 10/2020 |

\* cited by examiner

END EFFECTOR FOR GRIPPING AND SPINNING PIPES

CROSS-REFERENCE TO RELATED APPLICATIONS

This application claims benefit of European patent application No. 21193466.6 filed Aug. 27, 2021, and entitled "End Effector for Gripping and Spinning pipes," which is hereby incorporated herein by reference in its entirety for all purposes.

STATEMENT REGARDING FEDERALLY SPONSORED RESEARCH OR DEVELOPMENT

Not applicable.

BACKGROUND

The disclosure relates generally to an end effector for a robot. More specifically the disclosure relates to an end effector for gripping and spinning a pipe. In embodiments, the end effector comprises a head portion including a first connection interface for connecting the end effector to a robotic arm; a pair of jaws rotatably connected to the head portion between an open position and a gripping position; and a spinner for spinning a pipe held by the pair of jaws in the gripping position around a spinning axis generally corresponding to a longitudinal central axis of the pipe. The disclosure also relates to a robot, a robot assembly, and a drilling installation.

Tasks performed on a drill floor, such as moving, positioning, and connecting pipe joints, usually involve a combination of manual work and heavy machinery. Such a combination involves a safety risk in itself. When pipe bodies, such as pup joints, subs, including crossovers, lifting subs, kelly valves, etc. are to be connected to a pipe string, a person will usually be involved for connecting a hook end of a tugger winch to carry the pipe body from a storage location to the well centre. When in position over the well centre, a manual chain tongue will often be used to make up the threads of the pipe together with corresponding threads of the pipe string stick-up.

More recently, various robotic solutions have been proposed to grip, move and spin stand and pipes on a drill floor and thereby reduce or avoid the need for manual work. One such solution for lifting and gripping stands is sold under name "Hydraracker" and is commercially available from National Oilwell Varco (NOV) Inc. Another solution is disclosed in WO 2016089216 A1. Common for these and other robotic drill floor solutions is that they require large, heavy, and often custom-made, robots to operate the end effectors, leaving relatively large footprints. This may be a drawback, in particular when retrofitting for upgrading existing rigs.

SUMMARY

Embodiments described herein have for their object to remedy or to reduce at least one of the drawbacks of conventional approaches, or at least provide a useful alternative to conventional approaches.

The object is achieved through features, which are specified in the description below and in the claims that follow.

Embodiments described herein are defined by the independent patent claims. The dependent claims define advantageous embodiments.

In a first embodiment, an end effector for gripping and spinning a pipe comprises:
- a head portion including a first connection interface for connecting the end effector to robot,
- a pair of jaws rotatably connected to the head portion between an open position and a gripping position;
- a spinner for spinning a pipe held by the pair of jaws in the gripping position around a spinning axis generally corresponding to a longitudinal centre axis of the pipe, wherein the first connection interface has a normal which is substantially parallel to the spinning axis.

The present applicant has surprisingly found out that by arranging the first connection interface with its normal oriented parallel to the spinning axis, a better load case may be obtained, whereby the robot, to which the end effector is connectable, may utilize its lifting capacity more efficiently. This makes it possible to use smaller, commercially available robots for handling pipes on drilling rigs, where previously large, custom-made robots have been used. The normal of the first connection interface will usually, depending on the design of the robot, coincide with the outgoing rotation axis and normal on a robotic mounting face. If the robot is a 6-axis robot, this also means that the end effector according to the invention may be hanging under, or alternatively being place above, the robotic arm when a pipe is held with its longitudinal axis vertically oriented. This also means that a $5^{th}$ axis on a 6-axis robot will be rotated 90° relative to the length axis of the robotic arm when a pipe is held vertically, implying that the connection interface/tool flange on the robot is always substantially perpendicular to the pipe being held by the end effector. One of the reasons for the improved load distribution is that the arrangement with the first connection interface having its normal parallel to the spinning axis allows for a re-distribution of motors, cylinders etc. necessary for the operation of the end effector, effectively making it possible to move the spinning axis closer to the connection interface and the robot as such, thereby reducing the lever arm. Another reason is the connection of the jaws to the robot through the head portion, as will become clearer when presenting the exemplary embodiment drawings below.

It should be noted that the term "pipe" as used herein is meant to include shorter or longer pipes bodies, including, but not limited to, joints, pup joints and subs, such as cross-overs, lifting subs, kelly valves etc.

In one embodiment, spinning of the pipe may be enabled by actively driven rollers provided on the jaws. The applicant has found that by providing actively driven rollers on the jaws, the head of the end effector, and thereby the whole end effector, may be made more compact since there is no need to provide spinning means centrally between the jaws. The compactness may be further emphasized by also providing the motors for operating the actively driven rollers on the jaws. In some embodiments, the motors may be hydraulic. The motors may also be electric, but current hydraulic motors offer more torque per size than currently available electric motors. One motor may be provided per jaw to operate one actively driven roller each. Optionally, the hydraulic motors may be driven by external supply of hydraulics that may be controllable by means of a respective proportional control valve electrically controlled and synchronised by a control unit, such as a PLC. The control unit may be included in the robotic control system. Operation of the proportional control valve may be based on operator input and/or autonomous operation of the control system based on sensor data input from the end effector, as will be explained below. Providing a proportional control valve for each motor removes the need for a flow diverter in the head portion, further contributing to the compactness of the end effector. To transfer torque from the motor to the actively driven roller, a shaft of each hydraulic motor may be connected to its respective actively driven roller by a sprocket and chain connection, which offer a simple, reliable and light-weight solution. In an alternative embodiment, a set of meshing gears may be used to obtain the connection.

In addition to the actively driven rollers, each jaw may be provided with one or more passive rollers, ensuring a uniform pressure on the pipes. The actively driven and/or the passive rollers may be serrated, optionally knurled with both vertical and horizontal serrations, to improve the frictional grip on the pipes.

In one embodiment, the pair of jaws may be operable between the open and gripping positions by a linear actuator. Use of a linear actuator to push the jaws to rotate together, typically via a link arm arrangement connecting the two jaws, provides a simple and compact solution for rotating the jaws towards and away from each other to grip and release a pipe, respectively. In one embodiment, the linear actuator may be a hydraulic actuator, further emphasizing the compactness of the end effector. A cylinder rod of the hydraulic actuator may then be connected to and act on the mentioned link arm arrangement effecting the movement between open and closed jaw positions. In an alternative embodiment, operating the jaws between open and closed position may be enabled by means of rotation motors acting on each jaw in the respective, rotary connections to the head portion.

In one embodiment, a cylinder portion of the hydraulic actuator may be connected to the head portion of the end effector. In a preferred embodiment the head portion is constituted by a single structural unit, thereby improving load transfer and enabling a compact and lightweight end effector. Connecting the linear actuator directly to the head portion improves load transfer between the end effector and the robot.

In one embodiment, the head portion may be formed with a second connection interface, wherein the hydraulic actuator may be connected to the second connection interface, the second connection interface having a normal oriented perpendicular to that of the first connection interface, the second connection interface being formed with an opening through which the cylinder rod extends in the direction of the normal of the second connection interface. In one embodiment, a flange of the cylinder portion of the hydraulic actuator may be bolted to the second connection interface. By forming the head portion with a second connection interface, and particularly, by forming this second connection interface with an opening/hole through which cylinder rod extends in use, the compactness of the end effector is further enhanced. In one embodiment, the first and second connection interfaces of the head portion may be connected via a trusswork, providing a light-weight structure with efficient transfer of loads between the end effector and the robot. In one embodiment, the head portion may be 3D printed to obtain the desired shape.

In one embodiment, the end effector may be made substantially from aluminium. In particular, the head portion may be made from aluminium. The exception will typically be parts of the end effector, such as the rollers, that are in contact with the rotating pipe, which may need to be made more wear-resistant. These parts may, for example, be made from or covered with wear-resistant materials such as alloy-steel and/or various diamond or metal oxide coatings.

In one embodiment, the end effector may be provided with one or more sensors for monitoring the position of the jaws and/or the gripping pressure on a pipe. The robot, to which the end effector is connectable, will usually be controlled by an external control system, as mentioned above, which may or may not be integrated with a control system on a drilling rig on which the robot is placed and operating. By providing feedback on such parameters as the position and gripping pressure, the process may be optimized and made safer. By feeding these parameters to the control system and controlling the end effector in closed loop, operation of the end effector may also be automated.

In a second aspect, embodiments described herein relate to a robot to which an end effector according to the first aspect of the invention is connected.

The robot may be a 6-axis robot with the end effector connected to the outgoing, $6^{th}$ axis. The implies that the outgoing, $6^{th}$ axis of the robot will also be substantially parallel to the spinning axis. 6-axis robots have become a standard in many industrial applications due to their flexibility and usability and are commercially available from a number of different suppliers. It should be noted, however, that the end effector according to the first aspect of the invention may be used together with a variety of different robots and manipulators, including robots and robotic arms/manipulators having fewer or more than 6 axes, while still providing the same technical advantages.

In a third aspect, embodiments described herein relate to a robot assembly including a robot according to the second aspect as well as a control system for operating the robot with the end effector. The control system may control the supply of external power, such as hydraulic or electric power, to the robot, and be adapted to receive sensor data from the robot. The sensor data may be used by and operator of the robot to control its operation and/or the sensor data may be used to operate the robot in closed loop.

In fourth aspect, embodiments described herein relate to drilling installation including a robot assembly according to the second aspect of the invention.

BRIEF DESCRIPTION OF THE DRAWINGS

For a detailed description of various exemplary embodiments, reference will now be made to the accompanying drawings in which.

DETAILED DESCRIPTION

Figure 1:
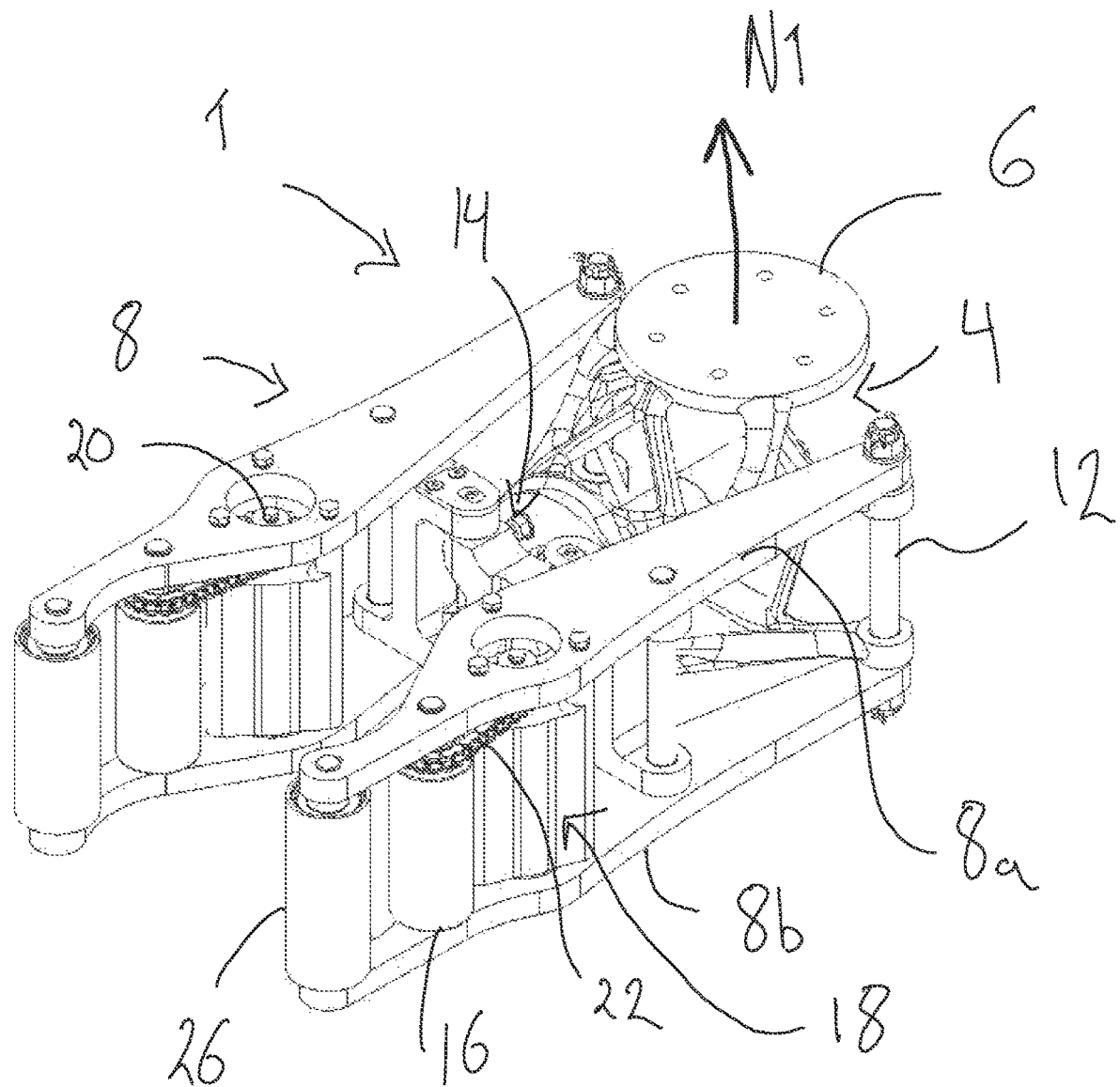
FIG. 1 shows an embodiment of an end effector according to principles described herein.

In the following, the reference numeral 1 will be used to denote an end effector according to the first aspect, while reference numerals 10 and 100 will be used to denote a robot and a drilling installation according to the second and fourth aspects, respectively. Identical reference numerals refer to identical or similar features in the drawings. Various features in the drawings are not necessarily drawing to scale. External power and communication connections to the end effector 1 and robot 10 are generally not shown in the figures for simplicity.

Figure 2:
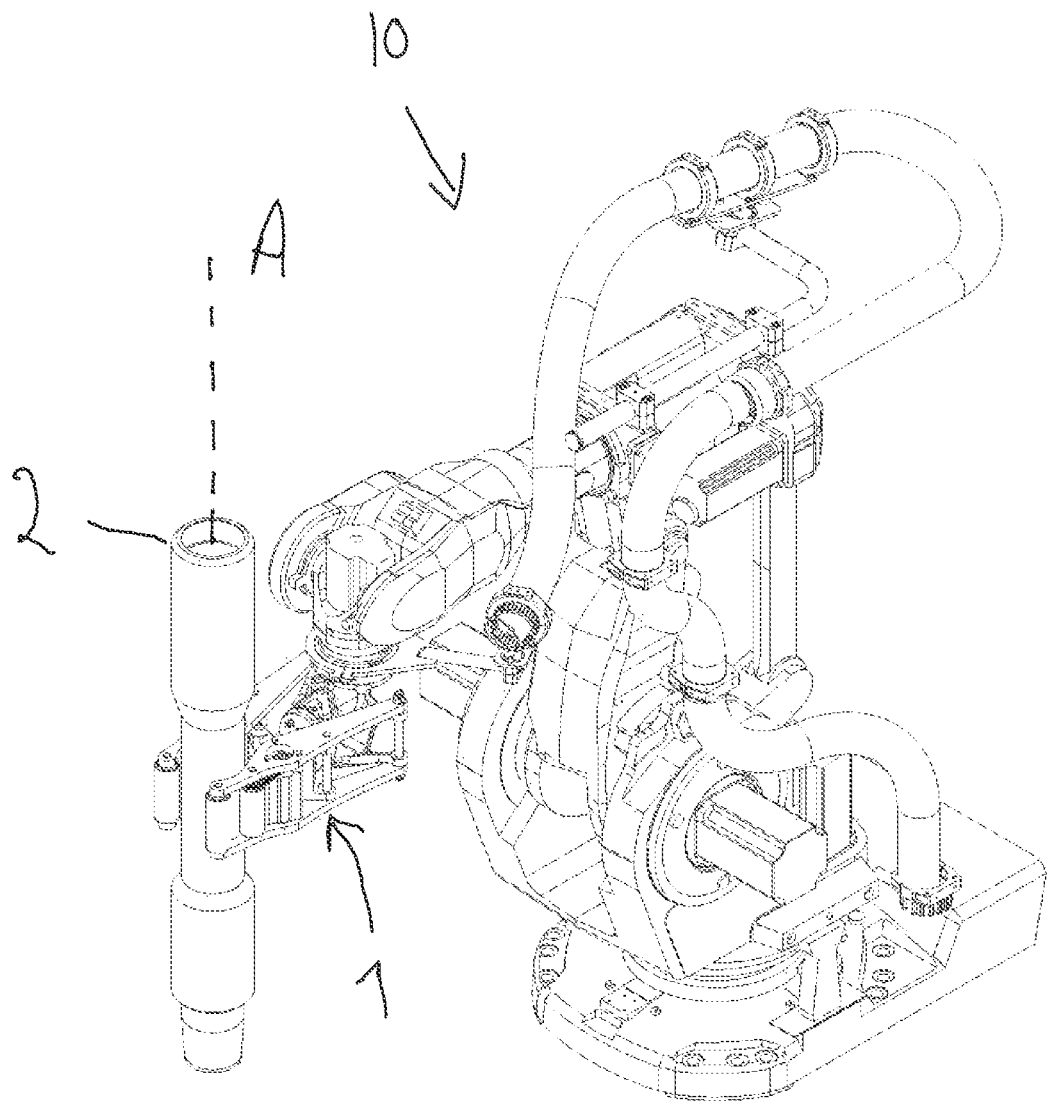
FIG. 2 shows an embodiment of a robot according to principles described herein.
Figure 4:
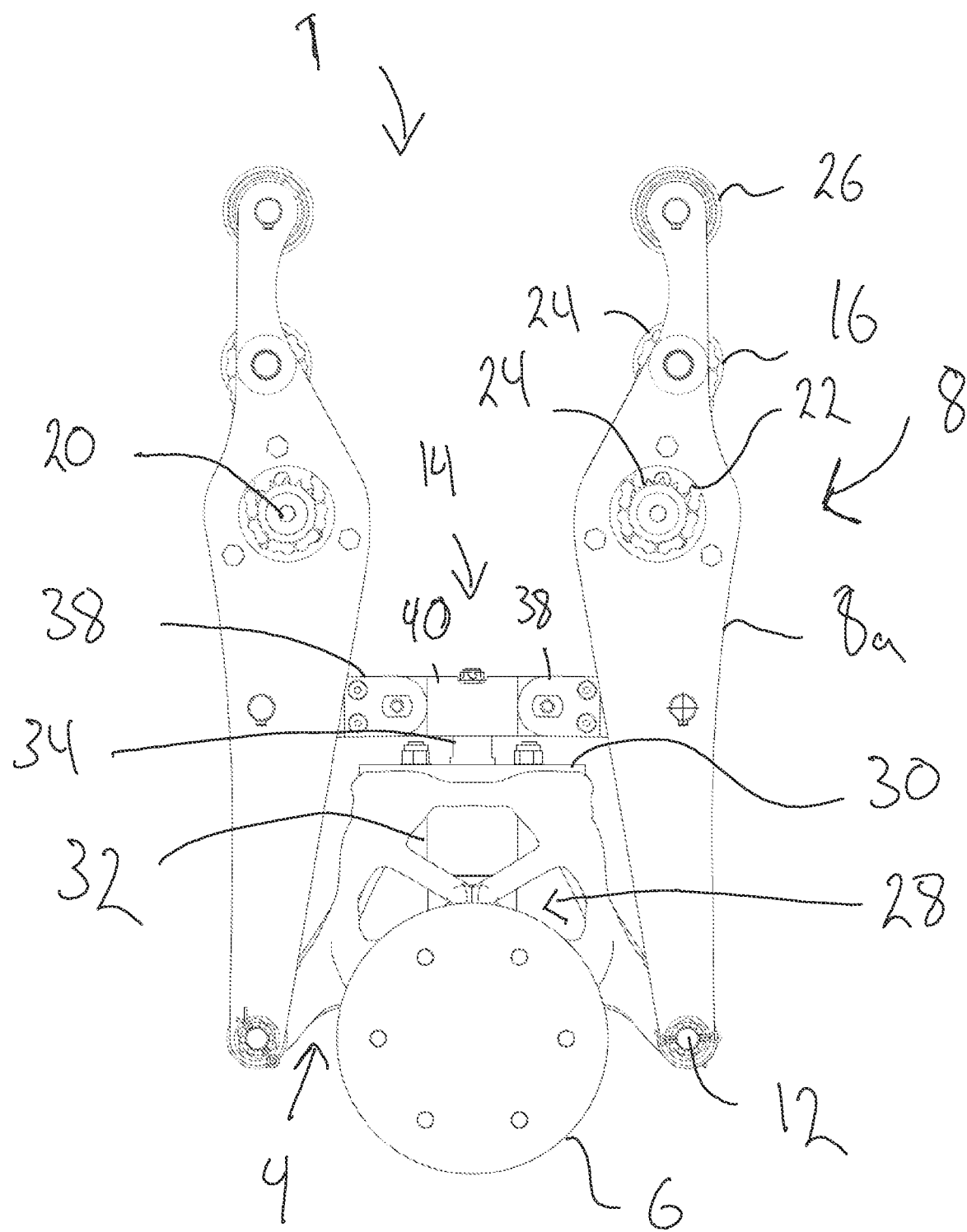
FIG. 4 shows, in a top view, the end effector of FIG. 1 in an open position.
Figure 5:
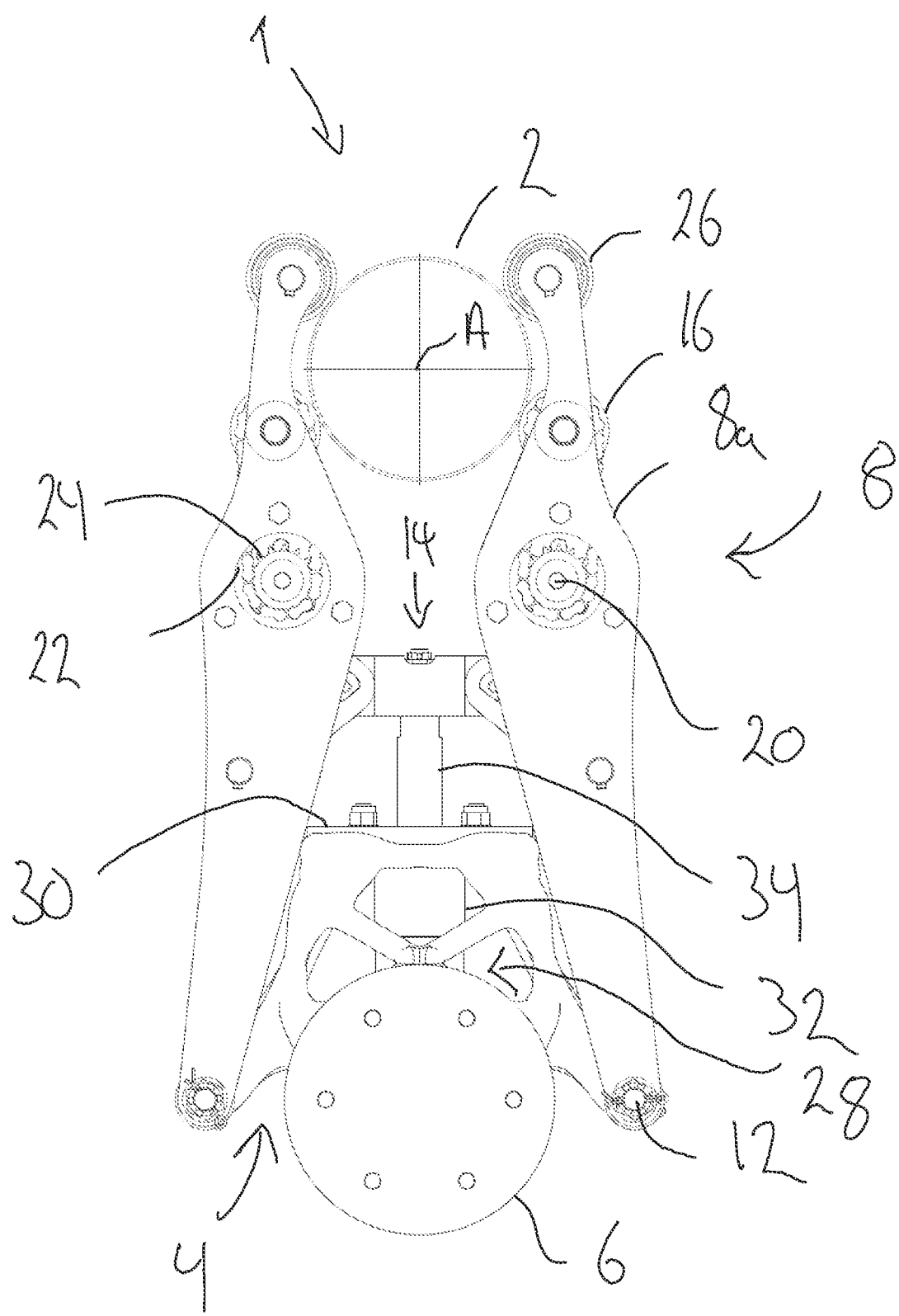
FIG. 5 shows, in a top view, the end effector of FIG. 1 in a gripping position.

In FIG. 1, an end effector 1 according to the first aspect is shown in perspective view. The end effector 1 is configured to grip and spin a pipe 2, as shown in FIG. 5 and discussed in more detail below. A head portion 4 of the end effector 1 includes a first connection interface 6 for connecting the end effector 1 to a mounting face on a robotic arm, as shown in FIG. 2. A pair of jaws 8 are connected to the head portion 4 via rods 12 defining respective parallel rotation axes for the jaws 8 on each side of the first connection interface 6. The first connection interface 6 has a normal N1. Each of the jaws 8 includes an upper portion 8a and a lower portion 8b, the jaws 8 being connected to each other via the head portion 4 and via a link arm arrangement 14 as will be discussed in more detail below. The end effector 1 further includes a spinner 16, here in the form of a pair of actively driven rollers; one on each jaw 8. The actively driven rollers 16 are rotatably suspended between the upper and lower portions 8a, b of the jaws 8, and operable by means of a respective hydraulic motor 18, only shown schematically, provided on each jaw 8, also positioned between the upper and lower portions 8a, 8b of the jaws 8. A rotatable shaft 20 of each hydraulic motor 18 is connected to its respective, actively driven roller 16 by means of a chain 22 and sprockets 24. A pair of passive rollers 26, one on each jaw 8, is also provided between the upper and lower portions 8a, b of the jaws 8 at distal ends of the jaws 8 to ensure a uniform grip on a pipe. A linear actuator 28, here in the form of a hydraulic actuator, as best seen in FIGS. 4 and 5, is connected to a second connection interface 30 on the head portion 4. The head portion 4 is best seen in the enlarged view of FIG. 6. A cylinder portion 32 of the hydraulic cylinder 28 is secured (e.g., bolted) to the second connection interface 30 with a cylinder rod 34 extending through a hole 36 in the second connection interface 30, the cylinder rod 34 extending in the direction of the normal N2 of the second connection interface 30, where the normal of the second connection 30 interface N2 is oriented perpendicular to the normal N1 of the first connection interface 6.

Figure 3:
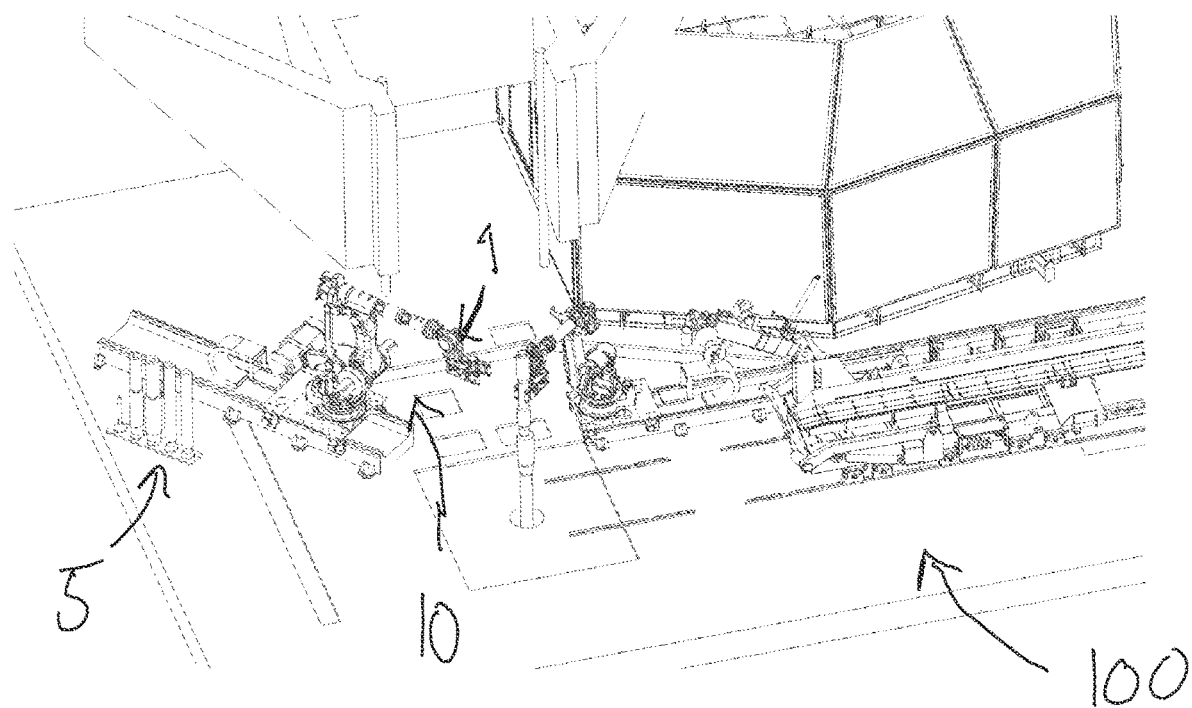
FIG. 3 shows an embodiment of a drilling installation according to principles described herein.

To move the end effector 1 from its open position, as shown in FIG. 4, to its gripping position, as shown in FIG. 5, the hydraulic cylinder 28 is pressurized to push the cylinder rod 34 forwardly in its length direction. The cylinder rod 34 is connected to the link arm arrangement 14 connecting the jaws 8 together. The link arm arrangement 14 includes a pair of first link arms 38, each first link arm 38 being rotatably connected around a vertical axis to a respective jaw 8 between the upper portion 8a and the lower portion 8b at a proximal end, while a distal end of each first link arm 38 is rotatably connected to a second link arm 40 around respective vertical axes. The second link arm 40 is connected to the distal end of the cylinder rod 34, whereby pushing the cylinder rod 34 forward in its length direction rotates the jaws 8 around their respective rotation rods 12 to swing the outer/distal ends of the jaws 8, including the actively driven rollers 16 and the passive rollers 26, inwardly to grip a pipe 2, as shown in FIG. 5. Spinning of the pipe 2, by means of the actively driven rollers 16, may now commence around the spinning axis A, corresponding to or substantially to the central axis of the pipe. By "substantially" in this context is meant that the grip on the pipe 2 may not always be perfectly symmetric, and there may be a small, negligible deviation between the spinning axis A and the central axis of the pipe 2. When the pipe 2 has been spun into a pipe string 3, as indicated in FIG. 3, the cylinder rod 34 may be driven backwardly to release the grip on the pipe 2, whereby the robot 10 may move the end effector 1 to another position, e.g. to grab a new pipe 2 from a set-back 5 as shown in FIG. 3.

FIG. 2 shows a robot 10 according to the second aspect. In the shown embodiment, the robot is a 6-axis robot as commercially available from a robot supplier. The connection interface 6 of the end effector 1 is connected to the (not shown) mounting face of the robot 10 at the outgoing, $6^{th}$ axis, sometimes also referred to as the T axis. As can be seen from the figure, the $5^{th}$ axis, sometimes also referred to as the B axis, is tilted 90° downwardly in the position shown so that the length axis of the pipe and the spinning axis A is vertically oriented or substantially vertically oriented.

Figure 6:
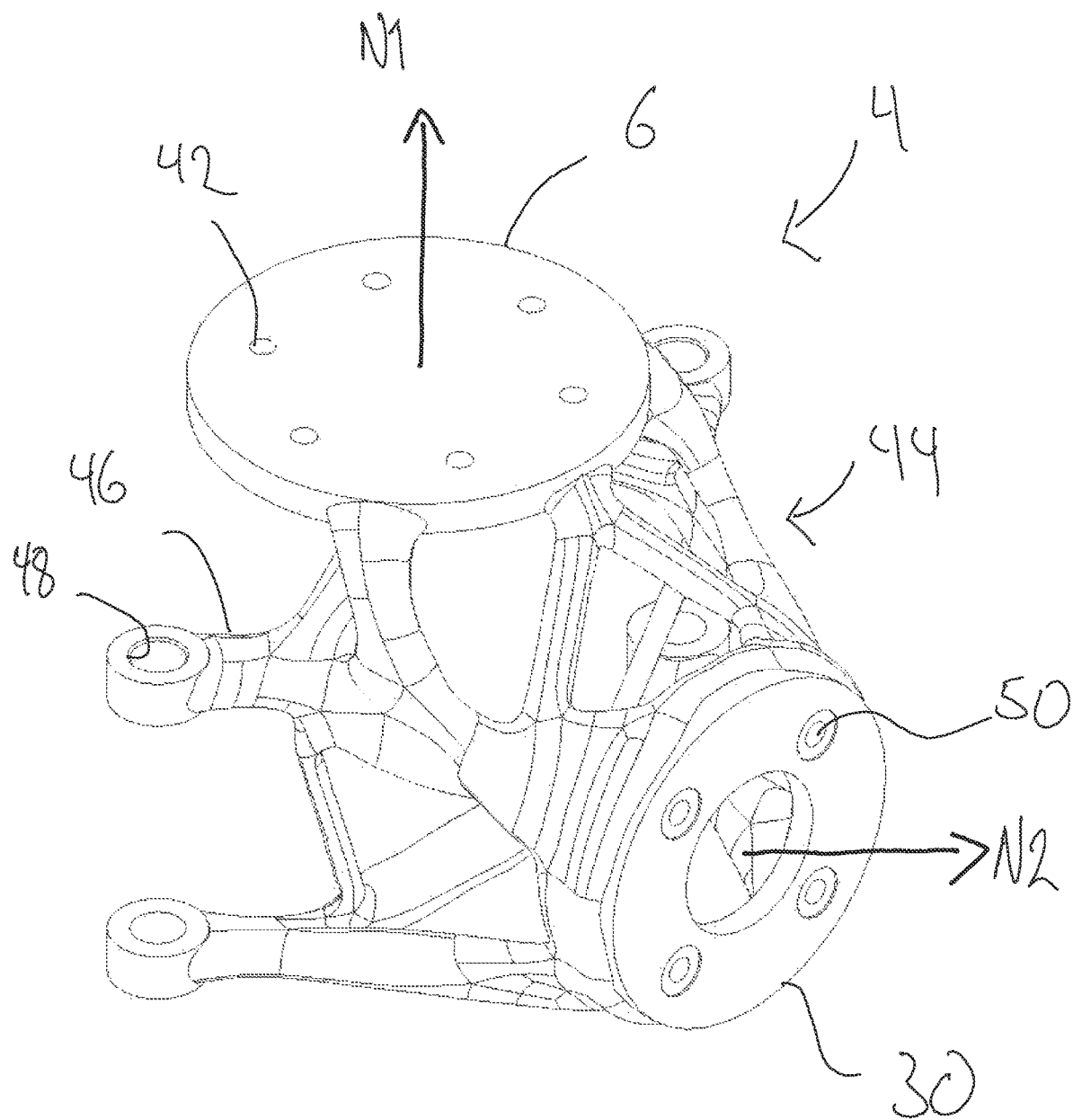
FIG. 6 shows an enlarged view of the head portion of the end effector of FIG. 1.

An enlarged detailed view of the head portion 4 is shown in FIG. 6. As can be seen, the first connection interface includes a plurality of bolt holes 42 for connecting the end effector 1 to a mounting face on the robot 10. In the shown embodiment, the first connection interface 6 is formed as a circular disc. However, different types of robots may have different, standardized connection faces, requiring different types of shapes for corresponding connection interfaces. In the shown embodiment, first connection interface 6 is connected to the second connection interface 30 via a truss work 44 with arms 46, each of which has a hole 48 at its distal end, extending to the side of the first connection interface 6 for connecting the jaws 8 to the head portion 4 via the rotation rods 12, as e.g. shown in FIG. 1. In the shown embodiment, the head portion 4 is produced by 3D printing aluminium.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements.

The mere fact that certain measures are recited in mutually different dependent claims does not indicate that a combination of these measures cannot be used to advantage.

The robotic control system may be operable by means of hardware comprising several distinct elements, and by means of a suitably programmed computer. In the device claim enumerating several means, several of these means may be embodied by one and the same item of hardware.

What is claimed is:

1. An end effector for gripping and spinning a pipe having a longitudinal central axis, the end effector comprising:
   a head portion including a first connection interface configured to directly connect the end effector to a mounting face of a robotic arm;
   a pair of jaws rotatably connected to the head portion, wherein the pair of jaws are configured to rotate between an open position and a gripping position;
   a spinner configured to spin the pipe held by the pair of jaws in the gripping position about a spinning axis (A) corresponding to the longitudinal central axis of the pipe, wherein the first connection interface has a normal (N1) oriented parallel to the spinning axis (A).

2. The end effector of claim 1, wherein actively driven rollers are provided on the jaws and are configured to spin the pipe about the spinning axis (A).

3. The end effector of claim 2, wherein hydraulic motors are provided on the jaws and configured to operate the actively driven rollers.

4. The end effector of claim 3, wherein a shaft of each hydraulic motor is configured to transfer torque to the actively driven roller via a sprocket and chain connection.

5. The end effector of claim 1, wherein the pair of jaws is configured to rotate between the open and gripping positions via a linear actuator.

6. The end effector of claim 5, wherein the linear actuator is a hydraulic actuator, and wherein a cylinder rod of the hydraulic actuator is connected to each jaw of the end effector with a link arm arrangement.

7. The end effector of claim 6, wherein a cylinder portion of the hydraulic actuator is connected to the head portion.

8. The end effector of claim 7, wherein the hydraulic actuator is connected to a second connection interface of the head portion, wherein the second connection interface has a normal (N2) oriented perpendicular to the normal (N1) of the first connection interface, and wherein the second connection interface includes an opening (36) through which the cylinder rod of the hydraulic actuator extends in the direction of the normal (N2) of the second connection interface.

9. The end effector of claim 8, wherein the first connection interface and the second connection interface are connected by a trusswork.

10. The end effector of claim 1, wherein the end effector is made substantially from aluminium.

11. The end effector of claim 1, wherein the end effector includes one or more sensors configured to monitor the position of the jaws, the gripping pressure applied to the pipe, or both the position of the jaws and the gripping pressure applied to the pipe.

12. A robot to which the end effector of claim 1 is connected.

13. The robot of claim 12, where in the robot is a 6-axis robot with the end effector connected to the outgoing, 6th axis of the robot such that the outgoing 6th axis of the robot is oriented parallel to the spinning axis (A).

14. A robot assembly, comprising:
the robot of claim 12;
a control system configured to operate the robot with the end effector.

15. A drilling installation comprising the robot assembly of claim 14.

* * * * *